Oct. 18, 1927.
M. POHLMANN
1,646,065
APPARATUS FOR X-RAY EXAMINATION AND X-RAY PHOTOGRAPHING
Filed Jan. 16, 1926
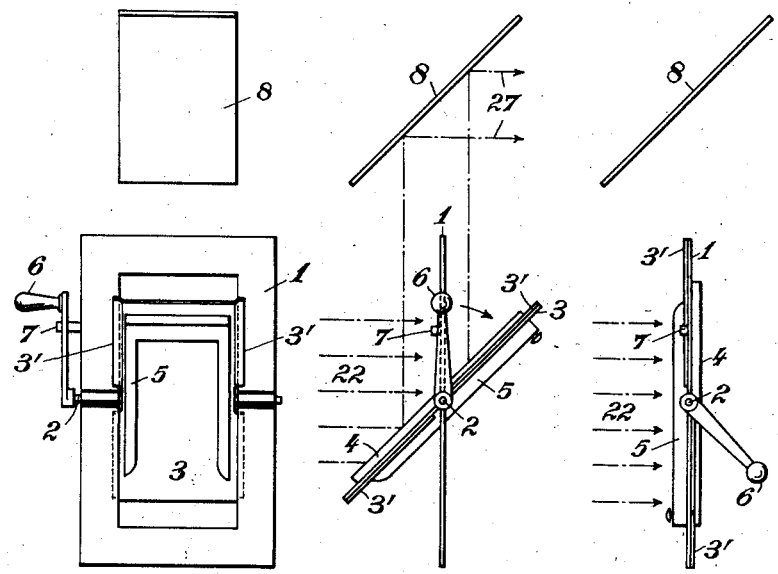

Patented Oct. 18, 1927.

1,646,065

UNITED STATES PATENT OFFICE.

MAX POHLMANN, OF BERLIN-KAULSDORF, GERMANY, ASSIGNOR TO SIEMENS & HALSKE AKTIENGESELLSCHAFT, OF SIEMENSSTADT, GERMANY, A CORPORATION OF GERMANY.

APPARATUS FOR X-RAY EXAMINATION AND X-RAY PHOTOGRAPHING.

Application filed January 16, 1926, Serial No. 81,803, and in Germany April 14, 1925.

The present invention relates to improvements in apparatus for X-ray examination and X-ray photography, especially of parts of the human body.

In devices of this character, a fluorescent screen, for instance of platinocyanide, and a box or holder for the photographic plate are usually arranged laterally of each other. When an object has been examined and subsequently is to be photographed the positions of the screen and the box are interchanged, both of said parts being shifted parallel to their main faces.

According to the invention the apparatus may be changed from an examination device to a photographing device and vice versa in a much shorter time than with the prior devices of this type by arranging the screen and the box on different sides of a common carrier, which preferably has the form of a plate. The change is effected by turning the carrier about an axis which is parallel to the main faces of the screen and the box. In order to effect a speedy change from one operation to the other by means of a single manipulation the drawing mechanism, which effects the exchange of places between the screen and the box, is preferably connected to the driving mechanism which effects the electrical changing over of the X-ray apparatus from an examination to a photographing apparatus. For the changing over of the X-ray apparatus switches should be used which are arranged on a common shaft and this shaft should be elastically coupled to the shaft of the carrier of the screen and the box.

Two embodiments of the invention are shown by way of example in the accompanying drawing.

Fig. 1 is a front view of a form of the new device set for radioscopy.

Fig. 2 is a lateral view of the same apparatus in the same position.

Fig. 3 is a lateral view of the same apparatus in position for photographing.

Fig. 4 shows diagrammatically the new apparatus and its connection with the electrical operating means of an X-ray outfit.

In Fig. 1 the X-rays are assumed to impinge upon the fluorescent screen from the rear side of the drawing. The screen can be observed by means of a stationary mirror 8. In the Figures 2 and 3 the X-rays 22 are assumed to come from the left, as indicated. The dot-and-dash lines 27 denote the light rays. The apparatus consists of a stationary frame 1 in which a shaft 2 is arranged. On this shaft a plate 3 is fastened, which on one side carries a fluorescent examination screen 4 and on the other side a frame 5 into which a photographic plate box or holder is to be inserted. On one side of the shaft 2 a crank 6 is arranged, the movement of which in one direction is limited by a stop 7 on the frame 1. When the crank 6 rests against the stop 7 the plate 3 and the screen 4 will form an angle of 45° with the stationary frame 1. (The stationary mirror 8, which serves for the observation of the screen 4, will in this position of the screen be parallel to the same.) In the opposite direction the movement of the crank 6 is limited by means of overlapping flanges 3' on the carrier plate 3. When the crank 6 is turned 135° in clock-wise direction from the position shown in Fig. 2, the flanges 3' will abut against the frame 1 and prevent a further movement in this direction. In this position, which is shown in Figure 3, the frame 5 is facing the X-ray tube and is in the correct position for taking an X-ray photograph. The plate box, which in such case must be inserted into the frame 5, is not shown. In the said position the X-rays 22 will strike the plate perpendicularly to its plane after they have passed through the body to be photographed.

Instead of a plate-shaped carrier 3 carriers of any other form for instance cube-shaped ones may be used. The essential feature of the novel device consists in that the shaft 2 is disposed parallel to the face of the screen 4 and to the main face of the box which is to be inserted into the frame 5.

Figure 4 shows the new device in a position similar to Figure 1 for examination of a body or body part by means of the screen. The crank 6 has been removed. The object to be radioscoped is assumed to be located behind the plane of the drawing in front of the fluorescent screen 4 (Figure 2). To one end of the shaft 2 one end of a strong spiral spring 23 is fastened, the other end of which terminates in an arm 24. Coaxially with the shaft 2 in the extension-line of the same a shaft 9 is arranged, the one end of which is equipped with a crank 13 and the other end of which is furnished with an abutment 14. In the position shown the crank 13 rests against a stationary stop 31. On the shaft 9 three contact arms 10, 11 and 12 are arranged, which cooperate respectively with stationary contacts 28, 25, and 26. The contacts 26 and 28 consists each of two contact plates, whilst the contact 25 consists of two segmental, concentrically arranged elements. To the upper contact 28 is connected one terminal of the primary coil 15 of an X-ray tube energizing transformer, the other parts of said transformer (which may be of any usual or approved construction) not being shown in the drawing. The other terminal of said coil 15 is connected with one of the alternating current mains or wires 15'. The other main 15' is connected with the lower contact 28, an adjustable resistance 16 forming part of the connection. One of the mains 15' is connected with one of the contacts 26. The other contact 26 is connected to the other main 15' over the main switch 20, the relay 19, the switch contacts 21 and the wire which connects the resistance 16 with the other main 15'. The contacts 25 are connected to the said mains 15' over a primary heating coil 18 and an adjustable resistance 30 for the X-ray apparatus. Across the connection wires from the contacts 25 an adjustable resistance 17 is shunted.

In the position shown there is still some play between the catch 14 and the arm 24, so that a certain angular movement of the shaft 9 can take place before the shaft 2 partakes in the movement. If now the crank 13 is turned away from the stop 31 the contact arm 10 will open the circuit of the primary winding 15 (position 10'). During the continued turning of the shaft 9 by means of the crank 13 the contact arm 11 will engage the contact segments 25 (dashed position 11'), whereby the resistance 17 is short-circuited, which hitherto was series-connected to the primary coil 18 of the heating transformer. Thereby the heating current for the X-ray apparatus is increased from the relatively low value for the radioscopy to the higher value required for photographing. At this moment the catch 14 hits the arm 24 and during the continued turning of the crank 13 the shaft 2 moves in unison with the shaft 9 until said shaft 2 has been moved through an angle of 135° from the position shown in the figure, whereby the frame 5 with the plate box is brought into position for exposition. This position is attained before the limit of movement of the crank 13 has been reached. When the shaft 9 now is further rotated the spring 23 is put under tension, whereby the flanges 3' on the plate 3 are pressed against the frame 1, so that the plate box is held securely in the correct position. The contact arm 12 is then in the position 12' indicated in dashed lines and during only the last part of the movement of the shaft 9 this contact arm enters into engagement with the contact pieces 26. Hereby the circuit is closed for the relay 19 which is series-connected to the main switch 20. The circuit of the primary coil 15, which was opened as the contact arm 10 was removed from the contact 28, is now again closed over the switch contacts 21 of the relay 19, and the photographing can take place.

The coupling 14, 24 may also be released and the turning of the shaft 2 may be effected by means of a crank on the left end of the shaft. In this case the contact arms 10, 11, 12 are moved individually, independently of each other.

If a roll film box is used the angular movement of the screen and the photographic box may be employed to bring a new film into position.

What I claim as my invention and desire to secure by Letters Patent is:—

1. An apparatus for performing radioscopy and radiography at will, comprising in combination, a support, a device on the same for receiving a photographic box, a fluorescent screen on said support and a turning shaft for the said support arranged parallel to the main faces of the support and of the said fluorescent screen, whereby the said device for receiving the photographic box and the said fluorescent screen are arranged in such a manner, that either one of them can be brought into the path of the X-rays when the said shaft is turned.

2. An apparatus for performing radioscopy or radiography at will, comprising in combination a supporting plate, a device adapted to receive a photographic box on one side of the said supporting plate, a fluorescent screen on the other side of said supporting plate, and a shaft for the said supporting plate arranged parallel to the main faces of the said supporting plate and the said screen.

3. An apparatus for performing radioscopy or radiography at will, comprising in combination, a rectangular supporting frame, two pivots connected to the edges of the said supporting plate and rotatably arranged in the said frame, a device for receiving a photographic box, arranged on one side of said supporting plate and a fluorescent screen arranged on the other side of the said plate.

4. An apparatus for performing radioscopy or radiography at will, comprising in combination, a rectangular frame, a rectangular supporting plate, two pivots connected to the edges of said supporting plate and rotatably arranged in the said frame, a device receiving a photographic box arranged on one side of the said supporting plate, a fluorescent screen on the other side of the said supporting plate and flanges on the support plate adapted to abut against the said frame in a certain position of said plate.

5. A device for performing radioscopy and radiography at will, comprising in combination, a rectangular frame, a rectangular supporting plate, two pivots connected to the sides of the said supporting plate and rotatably arranged in the said frame, a device for receiving a photographic box arranged on one side of the said supporting plate, a fluorescent screen arranged on the other side of the same plate, projecting flanges on said supporting plate adapted to abut against the said frame in a certain position of the said plate, a crank connected to one of the said pivots and a stop for the said crank.

6. An apparatus for performing radioscopy or radiography at will, comprising in combination, a support, a device on the said support adapted to receive a photographic box, a fluorescent screen on said plate, a shaft for the said support and arranged parallel to the main face of the said support plate and the said screen, whereby the said device for receiving a photographic box and the said fluorescent screen are arranged in such a manner that either one of them can be brought into the path of the X-rays, when the said shaft is rotated, means for generating the voltage necessary for operating an X-ray apparatus and switching devices connected to the said shaft and adapted to regulate the said generating means.

7. An apparatus for performing radioscopy or radiography at will, comprising in in combination, a support, a device for receiving a photographic box arranged on one side of the said support, a fluorescent screen arranged on the other side of the said support, a shaft for the said support arranged parallel to the main faces of the said support and the said fluorescent screen, means for generating the voltage necessary for operating an X-ray apparatus switching devices adapted to regulate the said generating means and a second shaft for the movable parts of the said switching devices, said second shaft being connected to the first mentioned shaft.

8. An apparatus for performing radioscopy and radiography at will, comprising in combination, a support, a device for receiving a photographic box arranged on one side of the said support, a fluorescent screen arranged on the other side of the said support, a shaft for the said support arranged parallel to the main faces of the said support and the said screen, means for generating the voltage necessary for operating an X-ray apparatus, switching devices adapted to regulate said means, another shaft for the movable parts of the said switching devices, said other shaft being arranged in line with the first mentioned shaft and resilient means for coupling both shafts operatively to each other.

9. An apparatus for performing radioscopy and radiography at will, comprising in combination, a support, a device for receiving a photographic box, arranged on one side of said support, a fluorescent screen arranged on the other side of the said support, a shaft for the said support, arranged parallel to the main faces of the said support and the said fluorescent screen, means for generating the voltage necessary for operating an X-ray apparatus, switching devices connected to the said shaft and adapted to regulate said means, another shaft for the movable parts of the said switching devices arranged in line with the first mentioned shaft, a detachable resilient coupling for connecting adjacent ends of both shafts and a crank arranged on the free end of the said other shaft.

10. An apparatus for performing radioscopy or radiography at will, comprising in combination, a support, a device for receiving a photographic box, arranged on one side of the said support, a fluorescent screen arranged on the other side of the said support, a shaft for the said support arranged parallel to the main faces of the said support and the said screen, means for generating the voltage necessary for operating an X-ray apparatus, switching devices adapted to regulate said means, another shaft for the movable parts of the said switching devices, said other shaft being arranged in line with the first-mentioned shaft, a detachable resilient coupling for operatively connecting the adjacent ends of both shafts, a crank arranged on the free end of the said other shaft and means for limiting the movement of said crank to an angular movement of 135°.

11. An apparatus for performing radioscopy or radiography at will, comprising a movable support, a fluorescent screen carried on said support, means for holding a photographic box, also carried on said support, and means for moving the support to bring either the fluorescent screen or the photographic box into operative relation to the X-rays.

12. An apparatus for performing radioscopy or radiography at will, comprising a pivoted support, a fluorescent screen carried on said support, and means for holding a photographic box, also carried on said support, the pivotal movement of said support being effective to bring either the fluorescent screen or the photographic box into operative relation to the X-rays.

13. An apparatus for performing radioscopy or radiography at will, comprising a movable support, a fluorescent screen carried on said support, means for holding a photographic box, also carried on said support, means for moving the support to bring either the fluorescent screen or the photographic box into operative relation to the X-rays, a device producing current for the X-ray apparatus, and electric connections, controlled by the movement of said support, for adjusting the said current-producing device for the proper performance of radioscopy or radiography respectively.

In testimony whereof I affix my signature.

MAX POHLMANN.